(12) United States Patent
Wada et al.

(10) Patent No.: US 11,196,361 B2
(45) Date of Patent: Dec. 7, 2021

(54) ELECTRIC MOTOR CONTROL DEVICE

(71) Applicant: Mitsubishi Electric Corporation, Tokyo (JP)

(72) Inventors: Yasuhiko Wada, Tokyo (JP); Akihiro Tsumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/635,299

(22) PCT Filed: Oct. 3, 2017

(86) PCT No.: PCT/JP2017/035952
§ 371 (c)(1),
(2) Date: Jan. 30, 2020

(87) PCT Pub. No.: WO2019/069363
PCT Pub. Date: Apr. 11, 2019

(65) Prior Publication Data
US 2021/0006185 A1    Jan. 7, 2021

(51) Int. Cl.
*H02P 5/74*    (2006.01)
*H02P 3/22*    (2006.01)
*H02P 3/24*    (2006.01)

(52) U.S. Cl.
CPC ............... *H02P 5/74* (2013.01); *H02P 3/22* (2013.01); *H02P 3/24* (2013.01)

(58) Field of Classification Search
CPC ...... H02P 5/74; H02P 3/22; H02P 3/24; H02P 6/04; H02P 3/025

(Continued)

(56) References Cited

U.S. PATENT DOCUMENTS

| 6,469,468 B1 * | 10/2002 | Hatsuda ............... H02P 25/092 |
| | | 318/254.2 |
| 9,602,037 B2 * | 3/2017 | Hamaguchi ........... H02P 25/092 |
| 10,951,140 B2 * | 3/2021 | Masumura ............... H02P 5/46 |

FOREIGN PATENT DOCUMENTS

| EP | 3 609 073 A1 | 2/2020 |
| JP | 2007-259554 A | 10/2007 |

OTHER PUBLICATIONS

International Search Report of the International Searching Authority dated Dec. 26, 2017 for the corresponding International application No. PCT/JP2017/035952 (and English translation).

(Continued)

*Primary Examiner* — David Luo
(74) *Attorney, Agent, or Firm* — Posz Law Group, PLC

(57) ABSTRACT

An electric motor control device controls driving of electric motors connected in parallel with each other and includes a power converter converting power from a power supply, and supply the converted power to each of the electric motors, a switching device to be turned on to electrically connect the power converter and at least one of the electric motors and to be turned off to electrically disconnect the power converter and the at least one of the electric motors, a current detection unit detecting a current that flows in the electric motors, and a controller controlling the power converter on the basis of operation of the switching device, rotation frequency command values from an external device, and a value of the current detected by the current detection unit. The controller turns the switching device from off to on so that start timing of control is different for each electric motor.

9 Claims, 7 Drawing Sheets

(58) Field of Classification Search
USPC .................................................. 318/86, 34
See application file for complete search history.

(56) References Cited

OTHER PUBLICATIONS

The Extended European Search Report dated Jul. 17, 2020 issued in corresponding EP application 17928010.2.

* cited by examiner

ELECTRIC MOTOR CONTROL DEVICE

CROSS REFERENCE TO RELATED APPLICATION

This application is a U.S. national stage application of International Application No. PCT/JP2017/035952, filed on Oct. 3, 2017, the contents of which are incorporated herein by reference.

TECHNICAL FIELD

The present disclosure relates to an electric motor control device that controls rotation of electric motors connected in parallel with each other and connected to a power converter.

BACKGROUND

Products such as an air-sending device having a fan mounted on a direct current (DC) brushless motor are in a freely rotating state because of the influence of outside wind or other factor before start of the air-sending device. The free rotation is a state in which a motor rotates without power supply. At this time, the motor rotates, and therefore an induced voltage corresponding to a rotation frequency is generated, and a motor current flows. As a configuration example of the direct current (DC) brushless motor, as to a plurality of motors connected in parallel with each other and connected to a single inverter, a switch is installed on a three-phase line connecting the inverter and each motor in such a manner that a motor in a freely rotating state is not the load of the other motors (for example, refer to Patent Literature 1).
Patent Literature
Patent Literature 1: Japanese Unexamined Patent Application Publication No. 2007-259554

In a method disclosed in the aforementioned Patent Literature 1, when each switch is in an on-state, and brake control for decelerating the motor is performed, there is a possibility that an excessive current flows. In the worst case, there is a possibility that the motors are demagnetized. In particular, in a case of a fan motor, when the brake control is performed, a situation in which a fan is rotated is brought about because of outside wind, and therefore an excessive current is likely to flow, and the motors are likely to be demagnetized.

SUMMARY

The present disclosure has been made to solve the aforementioned problem, and therefore provides an electric motor control device capable of reducing or eliminating a current that flows in motors, when brake control is performed.

An electric motor control device according to an embodiment of the present disclosure controls driving of a plurality of electric motors connected in parallel with each other and includes a power converter configured to convert power from a power supply, and supply the converted power to each of the plurality of electric motors, a switching device configured to be turned on to electrically connect the power converter and at least one of the plurality of electric motors and configured to be turned off to electrically disconnect the power converter and the at least one of the plurality of electric motors, a current detection unit configured to detect a current that flows in the plurality of electric motors, and a controller configured to control the power converter on the basis of operation of the switching device, rotation frequency command values from an external device, and a value of the current detected by the current detection unit. The controller is configured to perform control for turning the switching device from off to on in such a manner that start timing of control for decelerating the at least one of the plurality of electric motors is different from start timing of control for decelerating remaining at least one of the plurality of electric motors.

In an embodiment of the present disclosure, the controller controls timing of turning on the switching device, and therefore it is possible to shift start timing for brake control of at least one of electric motors. Consequently, it is possible to reduce or eliminate an effective value current that flows in the electric motors and other components, and it is possible to obtain an electric motor control device having high reliability.

DETAILED DESCRIPTION

Figure 1:
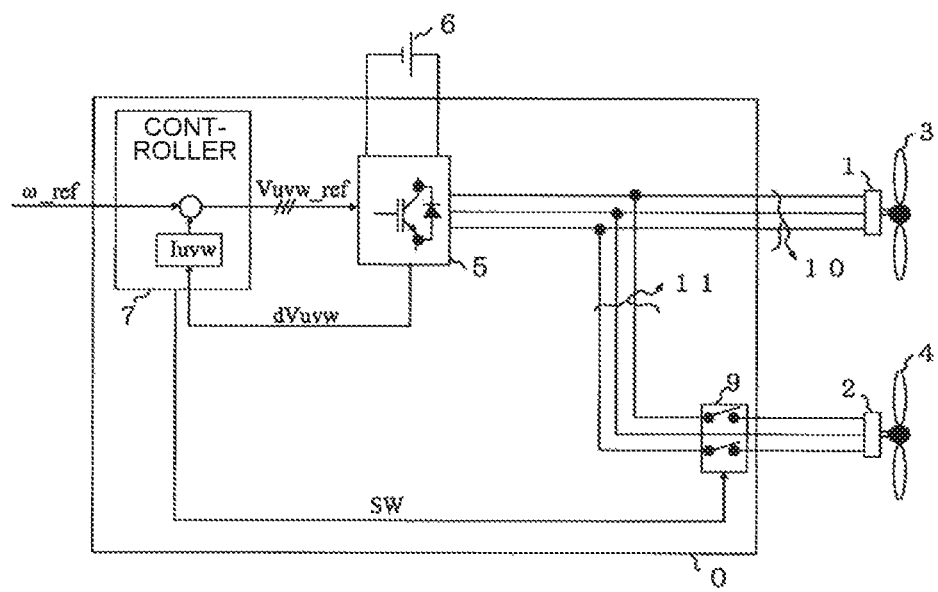
FIG. 1 is a diagram illustrating a configuration example of an air-sending system mainly composed of an electric motor control device 0 in Embodiment 1 of the present disclosure.

An electric motor control device 0 according to embodiments of the present disclosure will be described hereinafter with reference to the drawings. Herein, in the following drawings, components denoted by the same reference signs are the same or are equivalent to each other, and are common in the full text of the embodiments described below. Forms of components described in the full text of the specification are merely examples, and the forms of components are not limited to the forms described in the specification. In particular, combination of the components is not limited to only combination of the embodiments, and components described in other embodiments can be applied to other embodiment. Levels of pressure and temperature are not particularly determined by relation of absolute values, but relatively determined by a state, operation or other aspect of apparatuses and others. In the drawings, relation of sizes of components of devices, elements and others is sometimes different from actual relation.

Embodiment 1

Embodiment 1 will be described with reference to FIG. 1 to FIG. 6. FIG. 1 is a diagram illustrating a configuration example of an air-sending system mainly composed of an electric motor control device 0 in Embodiment 1 of the present disclosure. As illustrated in FIG. 1, the electric motor control device 0 has a controller 7 and a single inverter 5 configured to convert a DC voltage into a three-phase AC voltage. A first electric motor 1 and a second electric motor 2 are each an object to be controlled by the electric motor control device 0 and are connected in parallel with each other and connected to the inverter 5. A fan 3 is attached to the first electric motor 1 and sometimes reversely rotates by the influence of outside wind. A fan 4 is attached to the second electric motor 2 and sometimes reversely rotates by the influence of outside wind.

The first electric motor 1 is connected to the inverter 5 through a three-phase power line 10. The second electric motor 2 is connected to the inverter 5 through a three-phase power line 11 branched from the middle of the three-phase power line 10. The first electric motor 1 and the second electric motor 2 each have an unillustrated rotor and an unillustrated stator. The stator is applied with a three-phase voltage to generate a rotating magnetic field around the rotor. The inverter 5 is a power converter that performs DC-AC conversion for power from the DC power supply 6, and supplies the converted power to the first electric motor 1 and the second electric motor 2. The inverter 5 compares a waveform of a three-phase voltage command value Vuvw_ref included in a signal from the controller 7 with a carrier wave, and performs power conversion by PWM control. The DC power supply 6 is a DC voltage power supply that supplies power to the first electric motor 1 and the second electric motor 2 through the inverter 5. Herein, for example, a circuit that includes an unillustrated rectifier circuit, and coverts an AC voltage supplied from an external three-phase power supply into a DC voltage to output the converted DC voltage may be used as the DC power supply 6.

A signal including a value of a three-phase voltage drop dVuvw is sent from shunt resistors (8-1, 8-2, 8-3) provided in respective phases of the inverter 5 described below (refer to FIG. 3) to the controller 7. Then, the controller 7 performs a process of restoring a three-phase current Iuvw on the basis of the value of the three-phase voltage drop dVuvw. For example, the controller 7 outputs the three-phase voltage command value Vuvw_ref to the inverter 5 on the basis of a rotation frequency command value ω_ref sent as a signal from an unillustrated host control unit disposed outside the electric motor control device 0, and thus the restored three-phase current Iuvw, and thus controls driving of the inverter 5. Furthermore, the controller 7 performs a process of performing vector control of the first electric motor 1 and the second electric motor 2 by using the restored three-phase current Iuvw. The controller 7 performs a process of outputting a switching instruction signal SW to a relay 9 described below. The switching instruction signal SW is a signal for instructing the relay 9 to switch from an off state to an on state, or to switch from an on state to an off state, for example.

Figure 2:
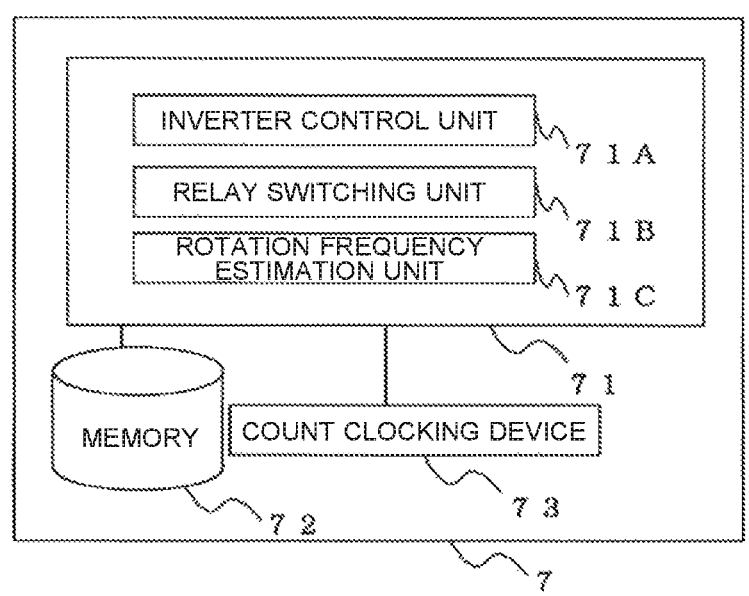
FIG. 2 is a diagram illustrating a configuration of a controller 7 according to Embodiment 1 of the present disclosure.

FIG. 2 is a diagram illustrating a configuration of the controller 7 according to Embodiment 1 of the present disclosure. The controller 7 of Embodiment 1 has a processing device 71, a memory 72, and a count clocking device 73 to perform the aforementioned processes. The memory 72 stores data used when the processing device 71 performs a process. The count clocking device 73 has a timer or other similar component, and performs clocking used for determination of time by the processing device 71.

The processing device 71 has an inverter control unit 71A, a relay switching unit 71B, and a rotation frequency estimation unit 71C. The inverter control unit 71A outputs the three-phase voltage command value Vuvw_ref to the inverter 5 on the basis of the rotation frequency command value ω_ref and the three-phase current Iuvw, and thus controls operation of the inverter 5. The relay switching unit 71B outputs the switching instruction signal SW to the relay 9, and thus controls operation of the relay 9. The rotation frequency estimation unit 71C estimates the rotation frequency of the electric motor on the basis of the three-phase current Iuvw. Herein, the rotation frequency estimation unit 71C particularly estimates the rotation frequency of the first electric motor 1.

Herein, the controller 7 is composed of, for example, a microcomputer, and other components. The processing device 71 has, for example, a central processing unit (CPU), and other components. The memory 72 has, for example, a volatile memory (not illustrated) such as a random access memory (RAM) capable of temporarily storing data, and a hard disk, a nonvolatile auxiliary memory (not illustrated) such as a flash memory capable of storing data for a long period of time. The memory 72 has data of a program for a processing procedure performed by the inverter control unit 71A, the relay switching unit 71B, and the rotation frequency estimation unit 71C. The processing device 71 performs processes on the basis of the data of the program, and implements the process of each unit. However, the configuration of the controller 7 is not limited to the above description, and each device may be composed of a dedicated device (hardware).

The relay 9 is a switching device installed on a route of the three-phase power line 11. When the relay 9 receives the switching instruction signal SW from the controller 7, the relay 9 turns on or off in accordance with the switching instruction signal SW, and electrically connects or disconnects the inverter 5 and the second electric motor 2 through the three-phase power line 10 and the three-phase power line 11.

When the relay 9 is in an off state, the second electric motor 2 is electrically disconnected from the inverter 5. For example, the fan 3, which corresponds to a load, is connected to the first electric motor 1, and the fan 4, which corresponds to a load, is connected to the second electric motor 2. When the relay 9 is in the off state, the second electric motor 2 is not connected to the first electric motor 1. Consequently, even when the second electric motor 2 is rotated by disturbance torque such as outside wind, it is possible to eliminate the influence of a regenerative current generated by the rotation of the second electric motor 2 on the first electric motor 1.

Figure 3:
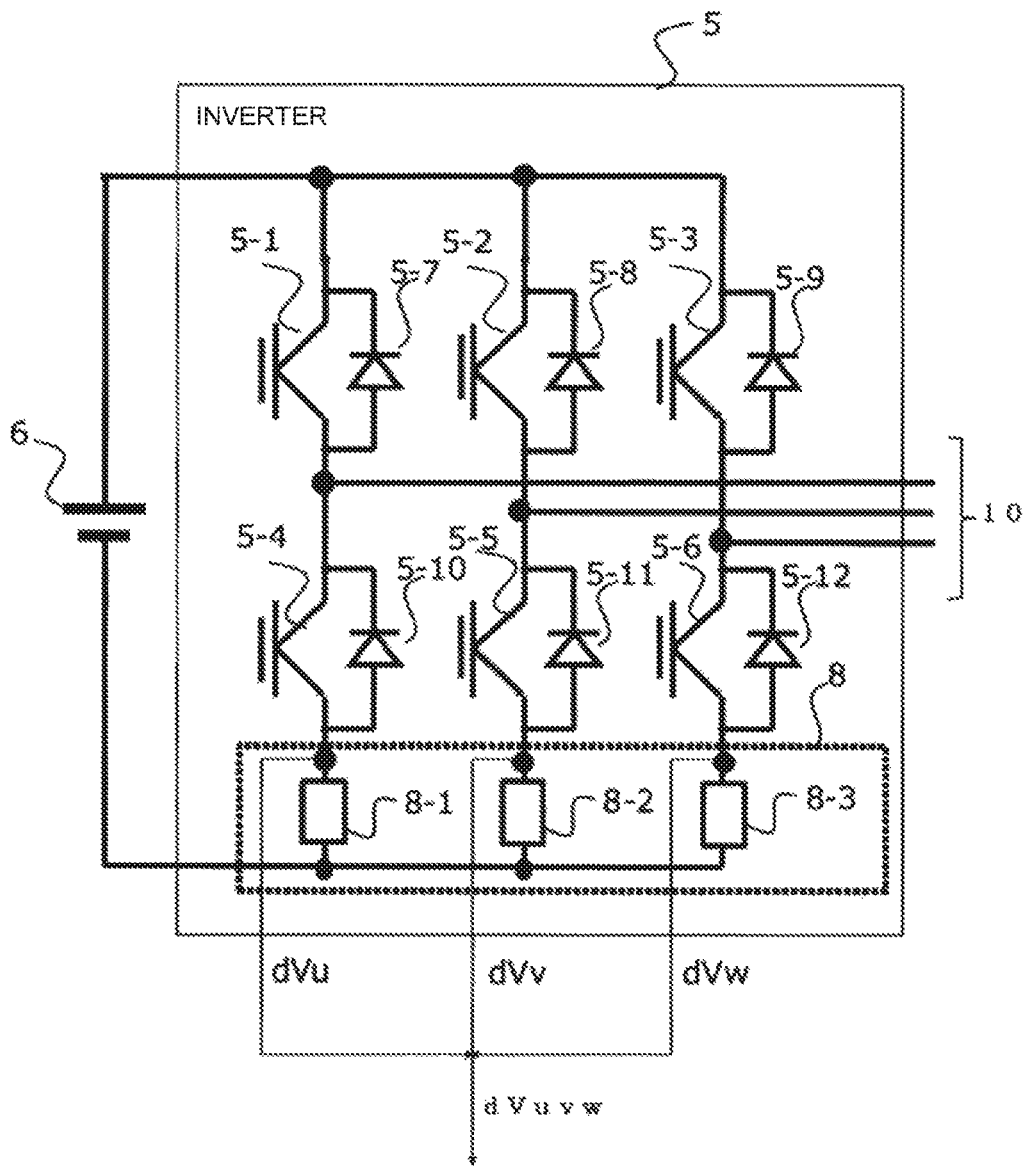
FIG. 3 is a block diagram illustrating a configuration example of an inverter 5 illustrated in FIG. 1, in Embodiment 1 of the present disclosure.

FIG. 3 is a block diagram illustrating a configuration example of the inverter 5 illustrated in FIG. 1, in Embodiment 1 of the present disclosure. As illustrated in FIG. 3, the inverter 5 has six switching elements (5-1 to 5-6) and backflow preventing elements (5-7 to 5-12). Each pair of an upper one and a lower one of the six switching elements (5-1 to 5-6) are installed in the corresponding one of the phases. The backflow preventing elements (5-7 to 5-12) are each provided in parallel with the corresponding one of the switching elements (5-1 to 5-6). The inverter 5 performs pulse width modulation (PWM) control in accordance with the three-phase voltage command value Vuvw_ref sent from the controller 7, and supplies, to at least the first electric motor 1, power obtained by converting the DC voltage of the DC power supply 6 into a three-phase AC voltage. Herein, turning on the switching elements (5-4 to 5-6) at the same time is referred to as a short circuit of lower arms. The first electric motor 1 or the second electric motor 2 can be decelerated by the short circuit of lower arms. Control for decelerating the first electric motor 1 or the second electric motor 2 by the short circuit of lower arms is defined as brake control. Herein, for convenience of explanation, relation of each pair of the switching elements is upper and lower relation. Consequently, physical arrangement relation in each pair of the switching elements does not need to be the upper and lower relation.

Herein, an example of materials constituting the switching elements (5-1 to 5-6) and the backflow preventing elements (5-7 to 5-12) will be described. A semiconductor made from silicon (Si) is typically used for each of the switching elements (5-1 to 5-6) and the backflow preventing elements (5-7 to 5-12). However, a wide bandgap semiconductor using, as a material, a semiconductor represented by materials such as a silicon carbide (SiC)-based material, a gallium nitride (GaN)-based material, and diamond may be used as a substrate material of each of the switching elements (5-1 to 5-6) and the backflow preventing elements (5-7 to 5-12).

The switching elements (5-1 to 5-6) and the backflow preventing elements (5-7 to 5-12) using the wide bandgap semiconductors each have high voltage resistance and a high allowable current, and can attain element downsizing. By using the downsized switching elements (5-1 to 5-6) and backflow preventing elements (5-7 to 5-12), a semiconductor module in which these elements are incorporated can be downsized.

The switching elements (5-1 to 5-6) and the backflow preventing elements (5-7 to 5-12) using the wide bandgap semiconductors each have a high heat-resisting property, and a cooling mechanism (for example, a radiating fin, and a water cooling mechanism) necessary for heat radiation of the inverter 5 can be downsized. Also, a cooling system can be simplified (for example, changed from a water cooling system to an air cooling system having a simple configuration). Consequently, it is possible to further downsize the semiconductor module in which the switching elements (5-1 to 5-6) and the backflow preventing elements (5-7 to 5-12) are incorporated.

Furthermore, the switching elements (5-1 to 5-6) and the backflow preventing elements (5-7 to 5-12) using the wide bandgap semiconductors each have a low power loss, and improve power conversion efficiency. Consequently, it is possible to drive the first electric motor 1 or the second electric motor 2 with high conversion efficiency. Herein, both the switching elements (5-1 to 5-6) and the backflow preventing elements (5-7 to 5-12) are desirably formed by use of the wide bandgap semiconductors, but any one of a set of the switching elements (5-1 to 5-6) and a set of the backflow preventing elements (5-7 to 5-12) may be formed by use of the wide bandgap semiconductor.

In the inverter 5, a shunt resistor 8-1 is provided between the switching element 5-4 and a negative power supply of the DC power supply 6. A shunt resistor 8-2 is provided between the switching element 5-5 and the negative power supply of the DC power supply 6. Furthermore, a shunt resistor 8-3 is provided between the switching element 5-6 and the negative power supply of the DC power supply 6. The shunt resistors (8-1 to 8-3) are collectively defined as a three-phase shunt resistor 8. Herein, the three-phase shunt resistor 8 is a current detection unit.

In the inverter 5, it is possible to detect a u-phase drop voltage dVu corresponding to a current that flows in the shunt resistor 8-1. It is possible to detect a v-phase drop voltage dVv corresponding to a current that flows in the shunt resistor 8-2. Furthermore, it is possible to detect a w-phase drop voltage dVw corresponding to a current that flows in the shunt resistor 8-3. Signals related to the detected phase drop voltages (dVu, dVv, dVw) are lumped together and sent to the controller 7. Herein, although an illustration is omitted, the shunt resistor 8-1 to the shunt resistor 8-3 may be each installed between the corresponding one of the switching elements (5-1 to 5-3) and a positive power supply of the DC power supply 6. In this case, first electric motor 1 or the second electric motor 2 can be decelerated by a short circuit of upper arms for turning on the switching elements (5-1 to 5-3) at the same time.

Figure 4:
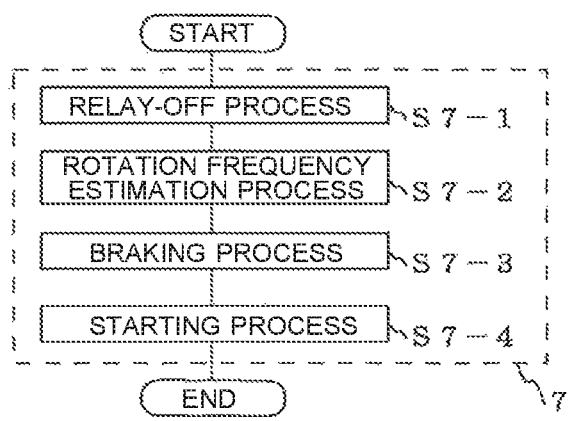
FIG. 4 is a diagram illustrating a flowchart of a control procedure performed by the controller 7 in Embodiment 1 of the present disclosure.

A procedure of control performed for the first electric motor 1 and the second electric motor 2 by the controller 7 will be described below with reference to FIG. 4, FIG. 5, and FIG. 6. FIG. 4 is a diagram illustrating a flowchart of a control procedure performed by the controller 7 in Embodiment 1 of the present disclosure. The controller 7 sequentially performs a relay-off process step S7-1, a rotation frequency estimation process step S7-2, a braking process step S7-3, and a starting process step S7-4. First, in the relay-off process step S7-1, the controller 7 outputs, to the relay 9, a switching instruction signal SW for turning off electric connection between the inverter 5 and the second electric motor 2. Consequently, the electric connection between the inverter 5 and the second electric motor 2 is disconnected.

Then, in the rotation frequency estimation process step S7-2, the controller 7 outputs a three-phase voltage command value Vuvw_ref set for rotation frequency estimation. The inverter 5 performs power conversion in accordance with the three-phase voltage command value Vuvw_ref. The controller 7 obtains data of the phase and the amplitude of an induced voltage in the first electric motor 1, from a value of the current detected by the three-phase shunt resistor 8. Then, the controller 7 estimates the rotation frequency of the first electric motor 1 on the basis of the data of the phase and the amplitude of the induced voltage in the first electric motor 1, and derives a rotation frequency estimation value. For example, when the first electric motor 1 is stopped, the induced voltage is 0 [V], and the rotation frequency is estimated to be 0 [r/min].

Figure 5:
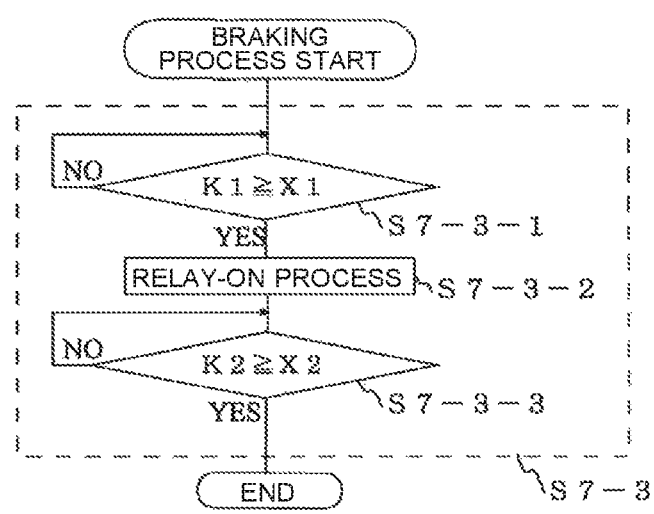
FIG. 5 is a diagram illustrating a flowchart of a detailed procedure of a braking process step S7-3 performed by the controller 7 in Embodiment 1 of the present disclosure.

FIG. 5 is a diagram illustrating a flowchart of a detailed procedure of the braking process step S7-3 performed by the controller 7 in Embodiment 1 of the present disclosure. When the relay 9 is in an off state, the controller 7 performs the braking process step S7-3, which is a process related to brake control. In the braking process step S7-3, the controller 7 performs a process through three procedures.

First, the controller 7 shifts the step to Step S7-3-1 of the braking process step S7-3, and starts counting from time when the brake control of the first electric motor 1 is performed. Then, the controller 7 determines whether or not count time K1 becomes not less than first brake control time X1, which is set time. When the controller 7 determines that the count time K1 becomes not less than the first brake control time X1, the step proceeds to Step S7-3-2. On the other hand, when the controller 7 determines that the count time K1 is less than the first brake control time X1, the controller 7 performs Step S7-3-1 again, and continues to count. Herein, the first brake control time X1 is set by referring to the rotation frequency of the first electric motor 1 estimated in the rotation frequency estimation process step S7-2. For the rotation frequency to be referred to, brake control is previously performed from a certain rotation frequency by an experiment, and reference time when the rotation frequency becomes 0 [r/min] is acquired as data. The first brake control time X1 is preferably set by use of the data of the reference time.

In Step S7-3-2, the controller 7 performs a relay-on process of outputting, to the relay 9, a switching instruction signal SW for turning on electric connection between the inverter 5 and the second electric motor 2. Consequently, the inverter 5 and the second electric motor 2 are electrically connected.

Then, the controller 7 shifts the step to Step S7-3-3, and starts counting from time when the brake control of the second electric motor 2 is performed. When the controller 7 determines that count time K2 becomes not less than preset second brake control time X2, the controller 7 terminates the braking process step S7-3. On the other hand, when the controller 7 determines that the count time K2 is less than the second brake control time X2, the controller 7 performs Step S7-3-3 again, and continues to count. Herein, as for the second brake control time X2, brake control is previously performed from the maximum rotation frequency of the second electric motor 2 by an experiment, and time when the rotation frequency becomes 0 [r/min] is acquired as data. Then, the second brake control time X2 is preferably set by use of the acquired data. The brake control is performed for the second brake control time X2, so that the rotation frequencies of the first electric motor 1 and the second electric motor 2 can be made to be 0 [r/min].

When the braking process step S7-3 is terminated, the controller 7 performs the starting process step S7-4 as illustrated in FIG. 4. In the starting process step S7-4, the controller 7 outputs the three-phase voltage command value Vuvw_ref required to normally rotate and drive the first electric motor 1 and the second electric motor 2. The inverter 5 performs power conversion in accordance with the three-phase voltage command value Vuvw_ref. The first electric motor 1 and the second electric motor 2 accelerate in accordance with the rotation frequency command value ω_ref. Herein, when the first electric motor 1 and the second electric motor 2 are synchronous electric motors, synchronization pull-in operation for aligning mutual magnetic pole positions is performed before the three-phase voltage command value Vuvw_ref is output.

Figure 6:
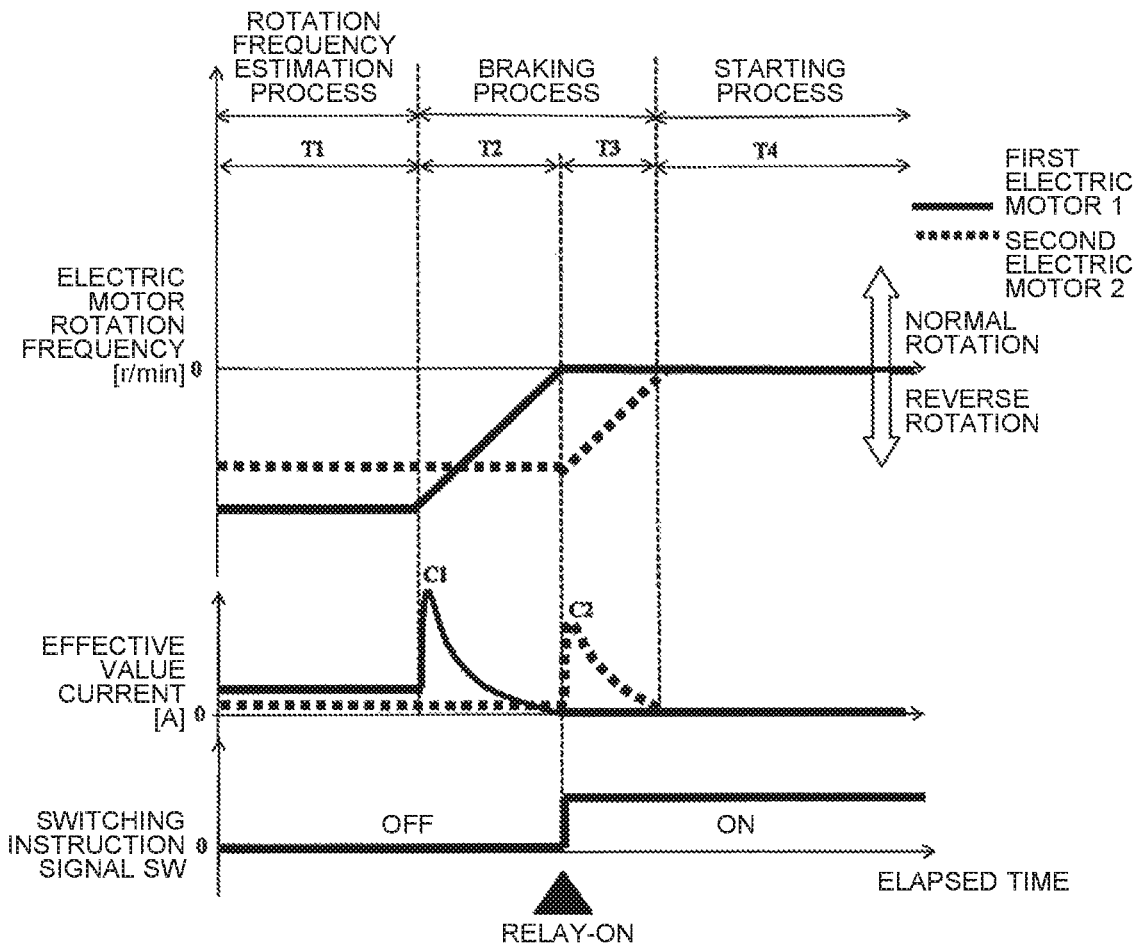
FIG. 6 is a diagram illustrating a timing chart that shows timing until a first electric motor 1 and a second electric motor 2 in Embodiment 1 of the present disclosure each perform a starting process.

FIG. 6 is a diagram illustrating a timing chart that shows timing until the first electric motor 1 and the second electric motor 2 in Embodiment 1 of the present disclosure each perform a starting process. The contents illustrated in FIG. 4 and FIG. 5 will be described with reference to the timing chart of FIG. 6. In the timing chart of FIG. 6, a first stage represents the electric motor rotation frequencies of the first electric motor 1 and the second electric motor 2. The solid line denotes the rotation frequency of the first electric motor 1, and the dotted line denotes the rotation frequency of the second electric motor 2. Herein, the rotation when the electric motor rotation frequency is 0 [r/min] or more is defined as normal rotation, and the rotation when the electric motor rotation frequency is less than 0 [r/min] is defined as reverse rotation. A second stage represents an effective value current that flows in each of the first electric motor 1 and the second electric motor 2. The solid line denotes the effective value current of the first electric motor 1, and the dotted line denotes the effective value current of the second electric motor 2. A third stage represents a driving state of the relay 9 by the switching instruction signal SW. Operation of the first electric motor 1, operation of the second electric motor 2, and operation of the relay 9 in each period of the rotation frequency estimation process step S7-2, the braking process step S7-3, and the starting process step S7-4 will be described below.

Rotation Frequency Estimation Process Step S7-2 Period (T1)

In a period T1, both the first electric motor 1 and the second electric motor 2 freely rotate. In FIG. 6, the first electric motor 1 and the second electric motor 2 reversely rotate. Then, the electric motors operate at different respective rotation frequencies. The first electric motor 1 reversely rotates at a higher rotation frequency than the second electric motor 2. On the other hand, the relay-off process step S7-1 is performed before the period T1, and therefore the relay 9 is in an off state in the period T1. Consequently, only the first electric motor 1 is electrically connected to the inverter 5. In the effective value current, a current that corresponds to the rotation frequency of free rotation flows. In the first electric motor 1, an effective value current higher than an effective value current that flows in the second electric motor 2 flows. In this period, the rotation frequency estimation process step S7-2 for the first electric motor 1 is performed, and the rotation frequency is estimated from an induced voltage.

Braking Process Step S7-3 Period (Period T2 and Period T3)

In period T2, the brake control is performed through Step S7-3-1, and the first electric motor 1 decelerates down to 0 [r/min]. On the other hand, the relay 9 is in an off state, and therefore the second electric motor 2 is not electrically connected to the inverter 5. Consequently, the second electric motor 2 is kept in a free rotation state. When the brake control related to Step S7-3-1 is performed, an effective value current of a current C1 momentarily flows in the first electric motor 1. However, the effective value current is reduced with the reduction of the rotation frequency. On the other hand, the second electric motor 2 is not electrically connected to the inverter 5, and therefore the effective value current corresponding to the free rotation frequency continues to flow.

In the period T3, the first electric motor 1 is in a stop state. On the other hand, the relay 9 is brought into an on state by Step S7-3-2, so that the second electric motor 2 is electrically connected to the inverter 5. Brake control is performed through Step S7-3-3, and the second electric motor 2 is decelerated down to 0 [r/min] by the brake control. At this time, the rotation frequency of the first electric motor 1 is 0 [r/min], and therefore the effective value current of the first electric motor 1 is 0 [A]. When the brake control related to Step S7-3-3 is performed for the second electric motor 2, the effective value current of a current C2 momentarily flows in the second electric motor 2. However, the effective value current is reduced with the deceleration of the rotation frequency.

Starting Process Step S7-4 Period (T4)

The rotation frequencies of the first electric motor 1 and the second electric motor 2 are each 0 [r/min]. The effective value currents of the first electric motor 1 and the second electric motor 2 are each 0 [A]. The relay 9 is in an on state.

As described above, in the electric motor control device 0 of Embodiment 1, the controller 7 turns on the relay 9 by the relay-on process after a lapse of the first brake control time X1 related to the brake control first performed for the first electric motor 1, in the braking process step S7-3. Consequently, the start timing of the brake control is made different in a plurality of electric motors, and the generation timing of the current C1 in the effective value current of the first electric motor 1 and the generation timing of the current C2 in the effective value current of the second electric motor 2 can be shifted. Consequently, it is possible to reduce or eliminate a current that flows in each of the first electric motor 1 and the second electric motor 2 after the relay 9 is turned on, and an effect of improving reliability of the electric motor control device 0 is exerted.

For example, by turned on the relay 9 immediately after the rotation frequency estimation process step S7-2, simultaneous generation of the current C1 in the first electric motor 1 and the current C2 in the second electric motor 2 is prevented to prevent an excessive current from flowing in the first electric motor 1 and the second electric motor 2 at the same time. From the above, it is possible to prevent demagnetization of the electric motors.

The controller 7 sets the first brake control time X1 of the first electric motor 1 on the basis of a result of the rotation frequency estimation process step S7-2. Consequently, it is possible to shorten time until the starting process step S7-4 is performed, and the relay 9 is prevented from being turned on while the first electric motor 1 is in the middle of deceleration. Consequently, it is possible to reduce or eliminate the current that flows in each of the first electric motor 1 and the second electric motor 2 after the relay 9 is turned on, and therefore an effect of improving reliability of the electric motor control device 0 is exerted.

Embodiment 2

An electric motor control device 0 of Embodiment 2 is different from the electric motor control device 0 of Embodiment 1 in the content of a process of a braking process step S7-3 of a controller 7. Device configurations and processes other than the braking process step S7-3 in the controller 7 are equivalent to those described in Embodiment 1. Hereinafter, specific processes in the electric motor control device 0 of Embodiment 2 will be described with reference to FIG. 7 and FIG. 8.

Figure 7:
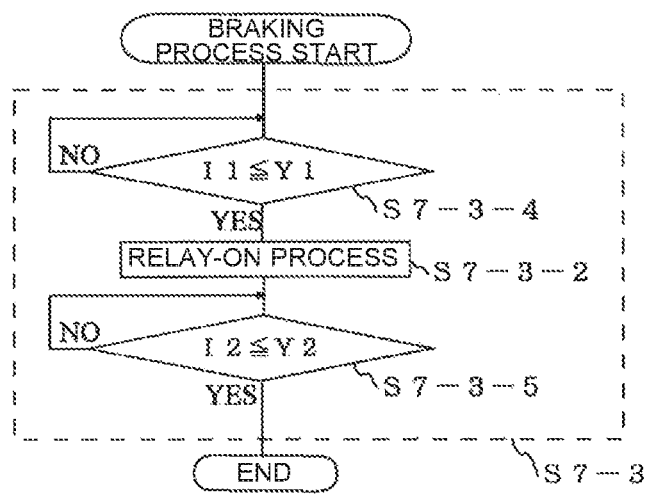
FIG. 7 is a diagram illustrating a flowchart of a detailed procedure of a braking process step S7-3 performed by a controller 7 in Embodiment 2 of the present disclosure.

FIG. 7 is a diagram illustrating a flowchart of a detailed procedure of the braking process step S7-3 performed by the controller 7 in Embodiment 2 of the present disclosure. The braking process step S7-3 according to Embodiment 2 is composed of Step S7-3-4, Step S7-3-2, and Step S7-3-5. In Step S7-3-4, when an effective value current I1 of any one of currents of a three-phase current Iuvw becomes not more than a brake control effective value current threshold value Y1 of a first electric motor 1, the controller 7 shifts the step to Step S7-3-2. On the other hand, when the effective value current I1 of any one of the currents of the three-phase current Iuvw exceeds the brake control effective value current threshold value Y1 of the first electric motor 1, the controller 7 performs Step S7-3-4 again. Herein, the brake control effective value current threshold value Y1 of the first electric motor 1 is desirably a lower value than an effective current value at which the first electric motor 1 operates in a freely rotating state. Herein, the brake control effective value current threshold value Y1 is set to, for example, 0 [A].

In Step S7-3-2, the controller 7 performs a relay-on process, and outputs a switching instruction signal SW to a relay 9. In Step S7-3-5, when an effective value current I2 of any one of the currents of the three-phase current Iuvw becomes not more than a brake control effective value current threshold value Y2 of a second electric motor 2, the controller 7 terminates the braking process step S7-3. On the other hand, when the effective value current I2 of any one of the currents of the three-phase current Iuvw exceeds the brake control effective value current threshold value Y2 of the second electric motor 2, the controller 7 performs Step S7-3-5 again. The brake control effective value current threshold value Y2 of the second electric motor 2 is desirably a lower value than an effective current value at which the second electric motor 2 operates in a freely rotating state. Herein, the brake control effective value current threshold value Y2 is set to, for example, 0 [A].

Figure 8:
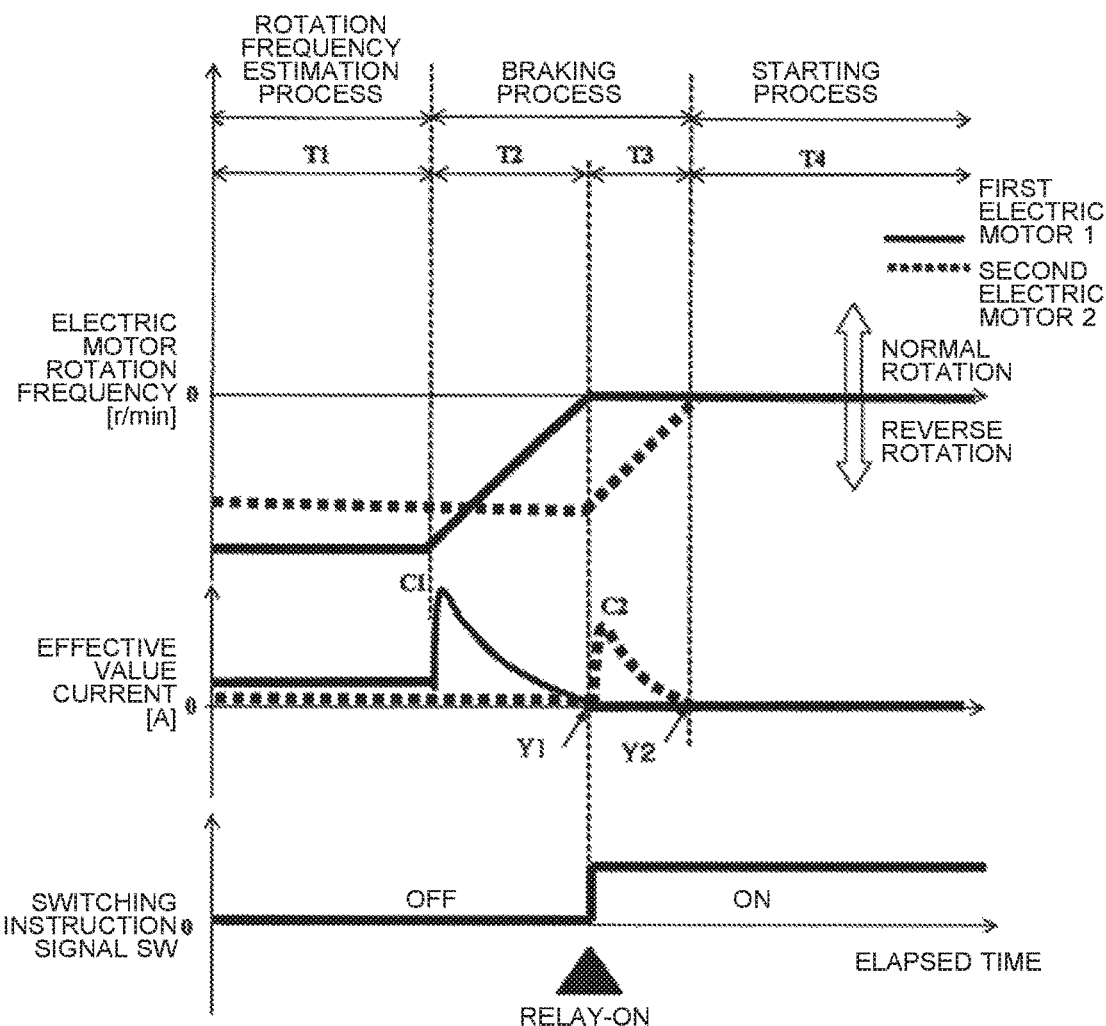
FIG. 8 is a diagram illustrating a timing chart that shows timing until a first electric motor 1 and a second electric motor 2 in Embodiment 2 of the present disclosure each perform a starting process.

FIG. 8 is a diagram illustrating a timing chart that shows timing until the first electric motor 1 and the second electric motor 2 in Embodiment 2 of the present disclosure each perform a starting process. Herein, the contents illustrated in FIG. 7 will be further described with reference to the timing chart of FIG. 8. The contents illustrated by waveforms in a first stage, a second stage, and a third stage are similar to those described in Embodiment 1. A period T1 in which a rotation frequency estimation process step S7-2 is performed, and a period T4 in which a starting process step S7-4 is performed are similar to those described in Embodiment 1. Operation of the first electric motor 1, operation of the second electric motor 2, and operation of the relay 9 in a period of the braking process step S7-3 of FIG. 7 will be described below.

Braking Process Step S7-3 Period (T2 and T3)

In the period T2, brake control is performed through Step S7-3-1, and the first electric motor 1 decelerates down to 0 [r/min]. On the other hand, the relay 9 is in an off state, and therefore the second electric motor 2 is not electrically connected to the inverter 5. Consequently, the second electric motor 2 is kept in a free rotation state. When the brake control related to Step S7-3-1 is performed, an effective value current of a momentary current C1 flows in the first electric motor 1. However, the effective value current I1 is reduced down to the brake control effective value current threshold value Y1 of the first electric motor 1 with the reduction of the rotation frequency. On the other hand, as for the effective value current of the second electric motor 2, the second electric motor 2 is not electrically connected to the inverter 5, and therefore a current corresponding to the free rotation continues to flow.

In the period T3, the effective value current of the first electric motor 1 becomes not more than the brake control effective value current threshold value Y1 of the first electric motor 1. On the other hand, the relay 9 is brought into an on state by Step S7-3-2, so that the second electric motor 2 is electrically connected to the inverter 5. Consequently, the second electric motor 2 is decelerated down to 0 [r/min] by the brake control. The rotation frequency of the first electric motor 1 is 0 [r/min], and therefore any induced voltage is not generated, and the effective value current of the first electric motor 1 is 0 [A]. Additionally, brake control is performed for the second electric motor 2, and therefore a momentary current C2 flows in the second electric motor 2. However, the effective value current is reduced down to the brake control effective value current threshold value Y2 of the second electric motor 2 with the deceleration of the rotation frequency.

As described above, in the electric motor control device 0 of Embodiment 2, the controller 7 compares the effective value current 11 of the first electric motor 1 with the brake control effective value current threshold value Y1, and performs the brake control, in the braking process step S7-3. Additionally, the controller 7 performs the brake control on the basis of the effective value current 12 and the brake control effective value current threshold value Y2 of the second electric motor 2. Consequently, even when a gust of wind blows immediately before the relay 9 is switched to be turned on, and the free rotation frequency of the first electric motor 1 is increased, timing of turning on the relay 9 can be adjusted. Consequently, it is possible to reduce or eliminate the current that flows in each of the first electric motor 1 and the second electric motor 2, and an effect of improving reliability of the electric motor control device 0 is exerted.

Embodiment 3

An electric motor control device 0 of Embodiment 3 is different from the electric motor control device 0 of Embodiment 1 in the content of a process of a braking process step S7-3 of a controller 7. Device configurations and other control configurations in the controller 7 are equivalent to those described in Embodiment 1. Hereinafter, specific processes in the electric motor control device 0 of Embodiment 3 will be described with reference to FIG. 9 and FIG. 10.

Figure 9:
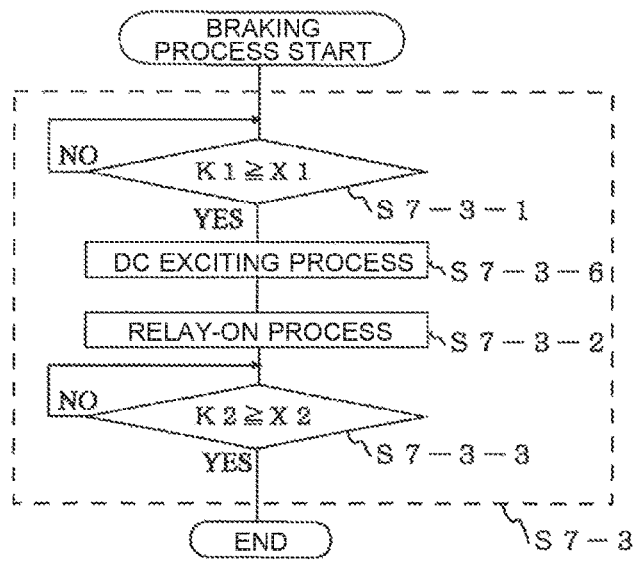
FIG. 9 is a diagram illustrating a flowchart of a detailed procedure of a braking process step S7-3 performed by a controller 7 in Embodiment 3 of the present disclosure.

FIG. 9 is a diagram illustrating a flowchart of a detailed procedure of the braking process step S7-3 performed by the controller 7 in Embodiment 3 of the present disclosure. The braking process step S7-3 according to Embodiment 3 is composed of Step S7-3-1, Step S7-3-6, Step S7-3-2, and Step S7-3-3. Herein, Step S7-3-1, Step S7-3-2, and Step S7-3-3 are similar to the processes described in Embodiment 1.

When count time K1 becomes not less than first brake control time X1 in Step S7-3-1, the controller 7 shifts the step to Step S7-3-6. In Step S7-3-6, the controller 7 performs a DC exciting process. More specifically, the controller 7 outputs a signal of a three-phase voltage command value Vuvw_ref to an inverter 5 to cause a direct current to flow in a first electric motor 1. Consequently, after the rotation frequency of the first electric motor 1 becomes 0 [r/min], a direct current flows from the inverter 5 to the first electric motor 1 for arbitrarily set time.

Figure 10:
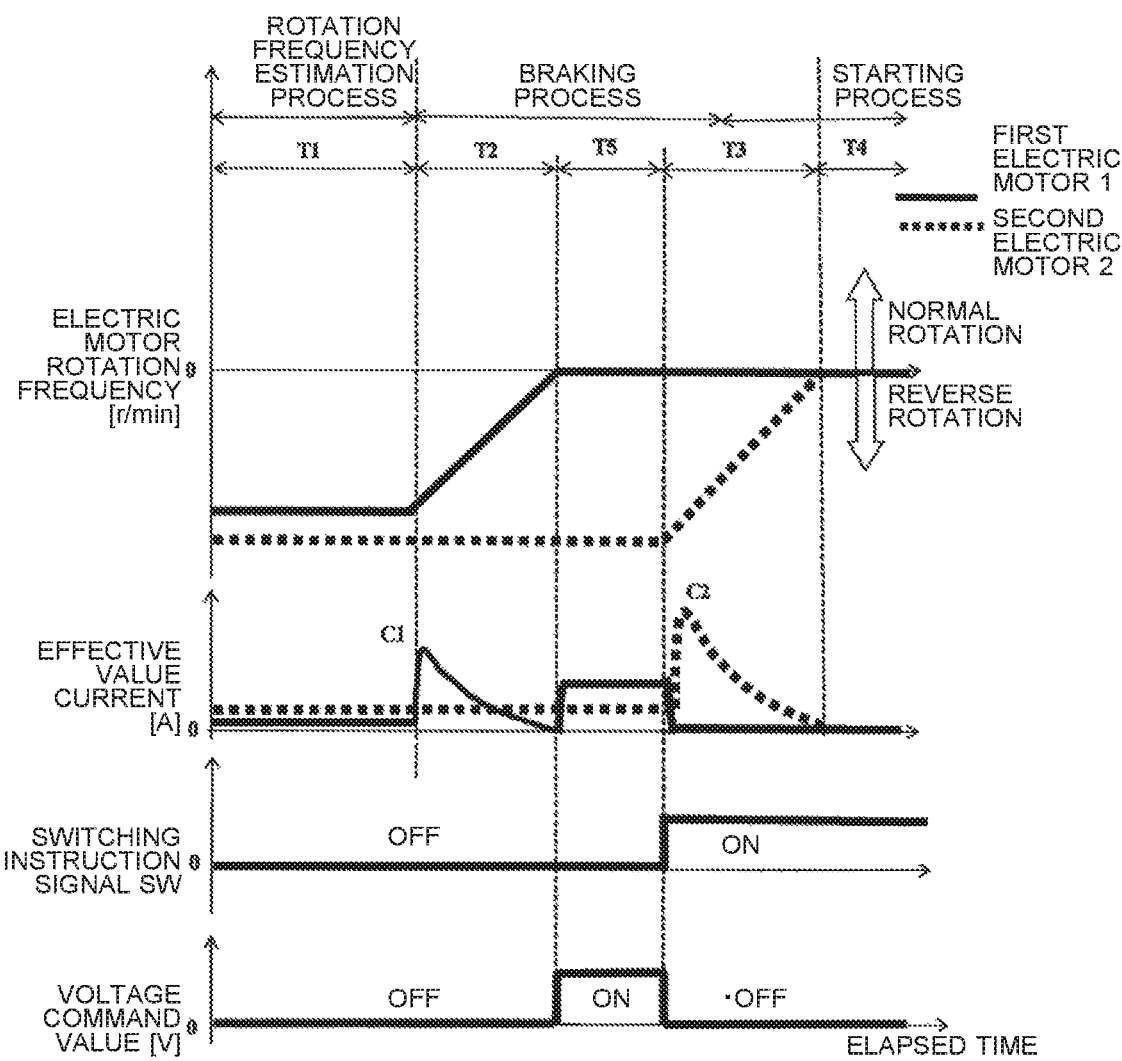
FIG. 10 is a diagram illustrating a timing chart that shows timing until a first electric motor 1 and a second electric motor 2 in Embodiment 3 of the present disclosure each perform a starting process.

FIG. 10 is a diagram illustrating a timing chart that shows timing until the first electric motor 1 and a second electric motor 2 in Embodiment 3 of the present disclosure each perform a starting process. The contents illustrated in FIG. 9 will be further described with reference to the timing chart of FIG. 10. The contents illustrated by waveforms in a first stage, a second stage, and a third stage are similar to those described in Embodiment 1. In FIG. 10, a signal waveform illustrating a generation status of the three-phase voltage command value Vuvw_ref is illustrated in a fourth stage. A period T1 in which a rotation frequency estimation process step S7-2 is performed, and a period T4 in which a starting process step S7-4 is performed are similar to those described in Embodiment 1. Operation of the first electric motor 1, operation of the second electric motor 2, and operation of the relay 9 in a period of the braking process step S7-3 of FIG. 9 will be described below.

Braking Process Step S7-3 Period (T2, T3, and T5)

The operation of the first electric motor 1, the operation of the second electric motor 2, and the operation of the relay 9 in the period T2 and the period T3 in a period of the braking process step S7-3 are similar to the operation described in Embodiment 1. In Embodiment 3, a period T5 in which a DC exciting process is performed by the controller 7 is added between the period T2 and the period T3. The length of the period T5 is not particularly limited, and can be arbitrarily set.

In the period T5, when the controller 7 determines that the rotation frequency of the first electric motor 1 is 0 [r/min] by the process of Step S7-3-1, the controller 7 performs a DC exciting process in Step S7-3-6. At this time, the controller 7 outputs the signal of the three-phase voltage command value Vuvw_ref to the inverter 5. By the DC exciting process, a direct current flows in winding of a stator of the first electric motor 1, a magnetic pole is excited, and a rotor is attracted to the stator. As illustrated in FIG. 10, a positive effective value current flows in the first electric motor 1. On the other hand, as for the effective value current of the second electric motor 2, the second electric motor 2 is not electrically connected to the inverter 5, and therefore a current corresponding to free rotation continues to flow. When time set as the period T5 elapses, the controller 7 shifts the step to Step S7-3-2, and turns on the relay 9, and the inverter 5 and the second electric motor 2 are electrically connected to each other.

As described above, in the electric motor control device 0 of Embodiment 3, the controller 7 generates the three-phase voltage command value Vuvw_ref to cause a direct current to flow in the first electric motor 1 in the middle of the braking process step S7-3, and thus controls the inverter 5. Consequently, the state in which the rotor is attracted to the stator is kept, to cause the first electric motor 1 not to rotate. Consequently, it is possible to reduce or eliminate free rotation by a gust of wind in the period T5, and the process is shifted to the period T3, a momentary current C2 that flows in the second electric motor 2 can be inhibited from becoming excessive at timing when brake control for the second electric motor 2 is performed. Consequently, it is possible to reduce or eliminate the current that flows in each of the first electric motor 1 and the second electric motor 2, and therefore an effect of improving reliability of the electric motor control device 0 is exerted.

Embodiment 4

An electric motor control device 0 of Embodiment 4 is different from the electric motor control device 0 of Embodiment 1 in the content of a process of a braking process step S7-3 of a controller 7. Device configurations and other control configurations in the controller 7 are equivalent to those described in Embodiment 1. Hereinafter, specific processes in the electric motor control device 0 of Embodiment 4 will be described with reference to FIG. 11 and FIG. 12.

Figure 11:
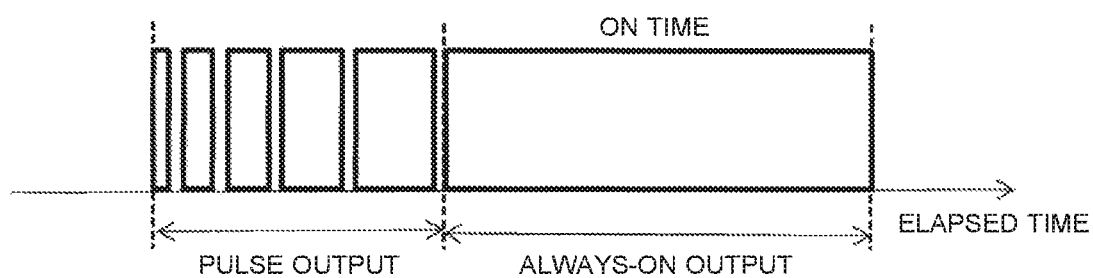
FIG. 11 is a diagram illustrating a brake pulse input in a braking process step S7-3 in Embodiment 4 of the present disclosure.

FIG. 11 is a diagram illustrating a brake pulse input in the braking process step S7-3 in Embodiment 4 of the present disclosure. When brake control is performed, for example, in the electric motor control device 0 of Embodiment 1, the switching elements (5-1 to 5-6) are controlled in such a manner that output of the inverter 5 is pulses for continuously short-circuiting three-phases, which is commonly called always-on output. On the other hand, in the electric motor control device 0 of Embodiment 4, switching elements (5-1 to 5-6) are controlled in such a manner that output of an inverter 5 is pulse output before always-on output.

Figure 12:
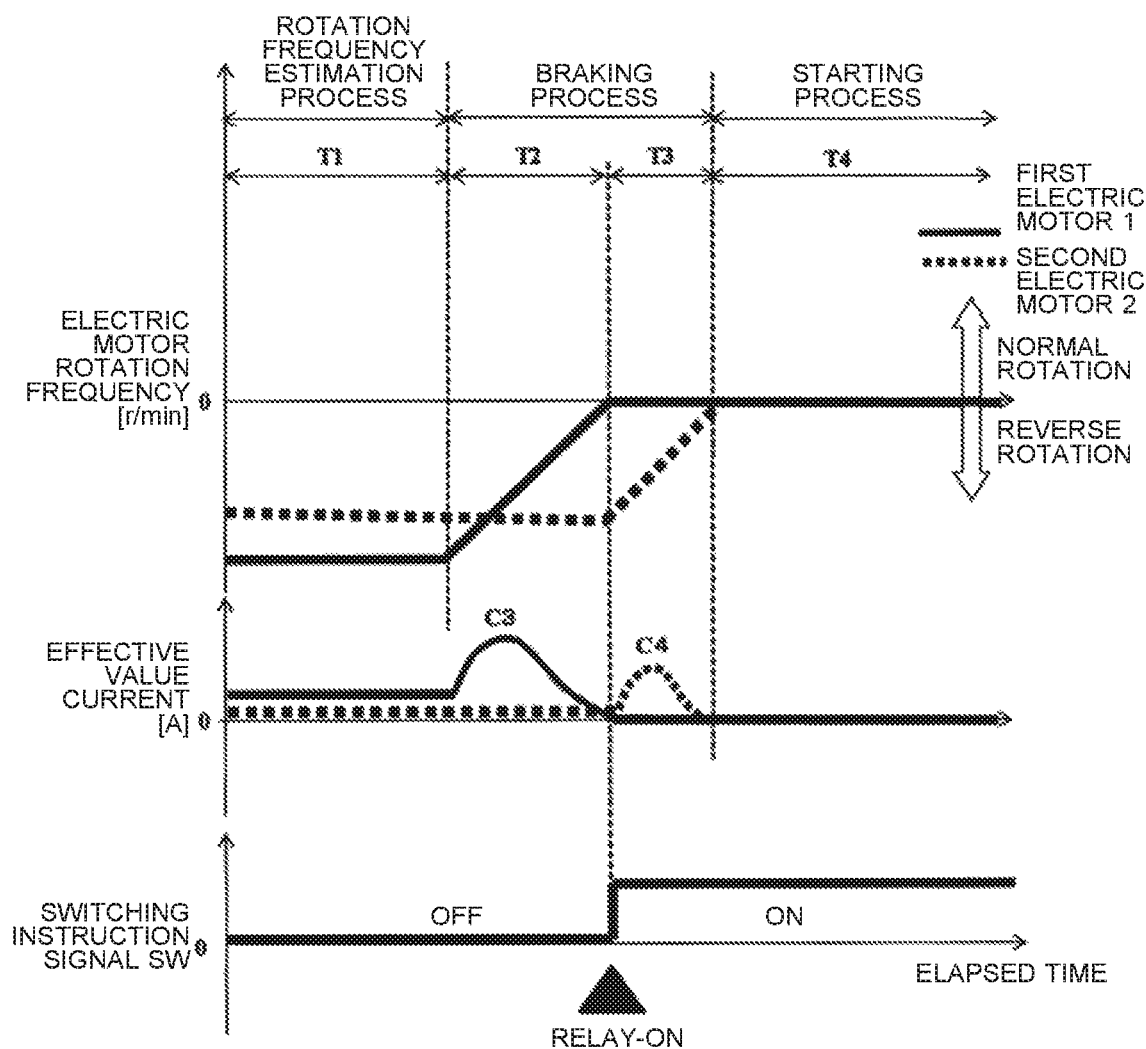
FIG. 12 is a diagram illustrating a timing chart that shows timing until a first electric motor 1 and a second electric motor 2 in Embodiment 4 of the present disclosure each perform a starting process.

FIG. 12 is a diagram illustrating a timing chart that shows timing until a first electric motor 1 and a second electric motor 2 in Embodiment 4 of the present disclosure each perform a starting process. The contents illustrated in FIG. 11 will be further described with reference to the timing chart of FIG. 12. The contents illustrated by waveforms in a first stage, a second stage, and a third stage are similar to those described in Embodiment 1. A period T1 in which a rotation frequency estimation process step S7-2 is performed, and a period T4 in which a starting process step S7-4 is performed are similar to those described in Embodiment 1. Operation of the first electric motor 1, operation of the second electric motor 2, and operation of a relay 9 in a period of the braking process step S7-3 of FIG. 12 will be described below.

Braking Process Step S7-3 Period (T2 and T3)

In the period T2, brake control is performed through Step S7-3-1, and the first electric motor 1 decelerates down to 0 [r/min]. On the other hand, the relay 9 is in an off state, and therefore the second electric motor 2 is not electrically connected to the inverter 5. Consequently, the second electric motor 2 is kept in a free rotation state. Brake control is performed for the first electric motor 1, and therefore a momentary current C3 flows in the first electric motor 1, but reduces with the reduction of the rotation frequency. On the other hand, as for the effective value current of the second electric motor 2, the second electric motor 2 is not electrically connected to the inverter 5, and therefore a current corresponding to the free rotation continues to flow.

In the period T3, the first electric motor 1 is in a stop state. On the other hand, the relay 9 is brought into an on state, so that the second electric motor 2 is electrically connected to the inverter 5. Consequently, the second electric motor 2 is decelerated down to 0 [r/min] by the brake control. The rotation frequency of the first electric motor 1 is 0 [r/min], and therefore any induced voltage is not generated, and the effective value current of the first electric motor 1 is 0 [A]. Additionally, brake control is performed for the second electric motor 2, and therefore a momentary current C4 flows in the second electric motor 2, but reduces with the deceleration of the rotation frequency.

As described above, in the electric motor control device 0 of Embodiment 4, the controller 7 performs brake control for performing always-on output after pulsatile output is performed at the time of brake control in the braking process step S7-3. Consequently, when the electric motor rotates at a high frequency, it is possible to prevent always-on output from being performed, and it is possible to reduce or eliminate a current that generates in a moment in which brake control is performed, a moment in which the relay 9 is brought into an on state, or other moment. Consequently, the momentary current C3 and the momentary current C4 that generate in Embodiment 4 are each smaller than the corresponding one of the momentary current C1 and the momentary current C2 that generate in Embodiment 1. Consequently, it is possible to reduce or eliminate the current that flows in each of the first electric motor 1 and the second electric motor 2, and therefore an effect of improving reliability of the electric motor control device 0 is exerted.

Embodiment 5

In each of the aforementioned electric motor control devices 0 of Embodiment 1 to Embodiment 4, the shunt resistors (8-1 to 8-3) are installed, and current detection is performed. However, how the current is detected is not limited to the above description. For example, a current sensor may be installed between the three-phase power line 10 and the relay 9 or between the three-phase power line 10 and the second electric motor 2 as a current detection unit. Then, the controller 7 performs control on the basis of a current detected by of the current sensor.

Brake control performed by the inverter 5 may be stopped on the basis of a current detected when a relay-on process is performed. When the relay 9 is turned on, and the fan 4 reversely rotates, there is a possibility that an excessive current flows from the second electric motor 2 toward the inverter 5, and the elements included in the inverter 5 are damaged. When the controller 7 determines that a detected current is larger than a preset value set in consideration of protection, the controller 7 stops brake control of the inverter 5, so that it is possible to protect the switching elements (5-1 to 5-6) and the backflow preventing elements (5-7 to 5-12), and an effect of improving reliability of the electric motor control device 0 is exerted.

In each of the electric motor control devices 0 of Embodiment 1 to Embodiment 4, the controller 7 performs the rotation frequency estimation process step 7-2, and performs the brake control on the basis of the rotation frequency obtained by estimation. However, how the brake control is performed is not limited to the above description. The first brake control time X1 or other parameter may be set on the basis of a detected current.

In Embodiment 1 to Embodiment 4, two of the first electric motor 1 and the second electric motor 2 are connected in parallel with each other and connected to the single inverter 5. However, the numbers of the components are not limited to the above described. Three or more electric motors may be connected in parallel.

The invention claimed is:

1. An electric motor control device that controls driving of a plurality of electric motors connected in parallel with each other, the electric motor control device comprising:
   a power converter configured to convert power from a power supply, and supply the converted power to each of the plurality of electric motors;
   a switching device configured to be turned on to electrically connect the power converter and at least one of the plurality of electric motors and configured to be turned off to electrically disconnect the power converter and the at least one of the plurality of electric motors;
   a current detection unit configured to detect a current that flows in the plurality of electric motors; and
   a controller configured to control the power converter on a basis of operation of the switching device, rotation frequency command values from an external device, and a value of the current detected by the current detection unit,
   the controller being configured to perform control for turning the switching device from off to on in such a manner that start timing of control for decelerating the at least one of the plurality of electric motors is different from start timing of control for decelerating remaining at least one of the plurality of electric motors.

2. The electric motor control device of claim 1, wherein the controller is configured to perform a process of deriving a rotation frequency estimation value of the remaining at least one of the plurality of electric motors on a basis of a phase and amplitude of an induced voltage in the remaining at least one of the plurality of electric motors obtained from the value of the current detected by the current detection unit, and, when the controller determines that set time corresponding to the rotation frequency estimation value elapses after start of control for decelerating the remaining at least one of the plurality of electric motors at first, the controller is configured to turn the switching device from off to on.

3. The electric motor control device of claim 2, wherein, after the controller determines set time elapses, the controller is configured to cause a DC voltage from the power converter to be applied to the remaining at least one of the plurality of electric motors for preset time, and turn the switching device from off to on.

4. The electric motor control device of claim 1, wherein the controller is configured to turn the switching device from off to on when the controller determines that the value of the current detected by the current detection unit is not more than a set current after start of control for decelerating the remaining at least one of the plurality of electric motors at first.

5. The electric motor control device of claim 1, wherein the power converter has a pair of switching elements that are an upper switching element and a lower switching element provided to each phase of the plurality of electric motors, and the controller is configured to turn on the upper switching elements of all phases that the power converter has or the lower switching elements of the all phases, and decelerate at least one of the plurality of electric motors.

6. The electric motor control device of claim 5, wherein, when the controller decelerates at least one of the plurality of electric motors, the controller is configured to output, to the power converter, a pulsatile signal for repeating on and off of the upper switching elements of the all phases or the lower switching elements of the all phases, and then output, to the power converter, a signal for keeping the upper switching elements or the lower switching elements turned on.

7. The electric motor control device of claim 5, wherein the pair of switching elements are each an element having a wide bandgap semiconductor.

8. The electric motor control device of claim 7, wherein the wide bandgap semiconductor is made from silicon carbide-based material, gallium nitride-based material, or diamond.

9. The electric motor control device of claim 1, wherein the controller is configured to stop operation of the power converter on a basis of the current detected by the current detection unit when the switching device is turned on.

* * * * *